United States Patent
Stone et al.

(10) Patent No.: US 10,344,878 B1
(45) Date of Patent: Jul. 9, 2019

(54) ROTARY HYDRAULIC DISTRIBUTION MANIFOLD FOR WATER PLAY FEATURES

(71) Applicant: Avalanche Waterslides, Inc., Chamois, MO (US)

(72) Inventors: Zachary M. Stone, Chamois, MO (US); Lance C. Fisher, Enderby (CA)

(73) Assignee: Avalanche Waterslides, Inc., Chamois, MO (US)

( * ) Notice: Subject to any disclaimer, the term of this patent is extended or adjusted under 35 U.S.C. 154(b) by 15 days.

(21) Appl. No.: 15/616,701

(22) Filed: Jun. 7, 2017

Related U.S. Application Data

(60) Provisional application No. 62/347,061, filed on Jun. 7, 2016.

(51) Int. Cl.
| | |
|---|---|
| F16K 11/085 | (2006.01) |
| F01D 5/12 | (2006.01) |
| F16K 5/04 | (2006.01) |
| F16K 25/00 | (2006.01) |
| A63G 31/00 | (2006.01) |

(52) U.S. Cl.
CPC .......... F16K 11/0856 (2013.01); F01D 5/12 (2013.01); F16K 5/0414 (2013.01); F16K 11/085 (2013.01); F16K 25/005 (2013.01); A63G 31/007 (2013.01); Y10T 137/86863 (2015.04)

(58) Field of Classification Search
CPC .. F16K 11/085; F16K 5/0414; F16K 11/0856; A63G 31/007; Y10T 137/86863
See application file for complete search history.

(56) References Cited

U.S. PATENT DOCUMENTS

| | | | | |
|---|---|---|---|---|
| 2,835,273 | A * | 5/1958 | McDonald | F16K 11/085 137/597 |
| 4,920,465 | A * | 4/1990 | Sargent | F21S 9/046 239/18 |
| 5,524,822 | A * | 6/1996 | Simmons | B05B 17/08 137/625.11 |
| 5,662,525 | A * | 9/1997 | Briggs | A63B 9/00 472/128 |
| 5,918,809 | A * | 7/1999 | Simmons | B05B 17/08 239/17 |
| 6,261,186 | B1 * | 7/2001 | Henry | A63G 1/12 239/16 |
| 6,755,349 | B2 * | 6/2004 | Beidokhti | B05B 17/08 239/16 |
| 7,059,349 | B2 * | 6/2006 | Breda | E03C 1/023 137/625.11 |
| 7,302,919 | B2 * | 12/2007 | Vacca | B60H 1/00485 123/41.08 |

(Continued)

*Primary Examiner* — Michael R Reid
*Assistant Examiner* — Christopher D Ballman
(74) *Attorney, Agent, or Firm* — Schacht Law Office, Inc.; Dwayne Rogge

(57) ABSTRACT

A rotary hydraulic distribution manifold for water play features comprising in one example: a fluid inlet; a housing having a fluid conduit to the fluid inlet; a distribution liner positioned within the housing; the distribution liner having a surface defining a distribution liner port; the housing having surfaces defining a plurality of housing outlets; and a drive unit configured to rotate the distribution liner within the housing to sequentially align the distribution liner port with the housing outlets so as to intermittently provide a fluid conduit between the fluid inlet and one or more housing outlets.

7 Claims, 3 Drawing Sheets

(56) References Cited

U.S. PATENT DOCUMENTS

| | | | | |
|---|---|---|---|---|
| 8,550,928 | B2* | 10/2013 | Hamelin | A63G 31/007 239/17 |
| 8,821,304 | B2* | 9/2014 | Ensing | A63G 31/007 472/128 |
| 9,228,664 | B2* | 1/2016 | Partridge | F16K 11/0856 |
| 9,446,275 | B2* | 9/2016 | Stone | A63B 9/00 |
| 9,512,929 | B2* | 12/2016 | Folkner | F16K 11/076 |
| 9,884,260 | B2* | 2/2018 | Weisman | A63H 23/16 |
| 2006/0143818 | A1* | 7/2006 | Bickmore | A47K 3/001 4/541.3 |
| 2011/0006237 | A1* | 1/2011 | Tower | F16K 3/08 251/304 |
| 2014/0174541 | A1* | 6/2014 | Jencks | F16K 11/02 137/1 |

* cited by examiner

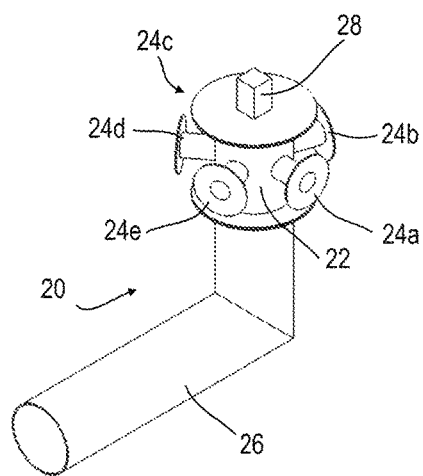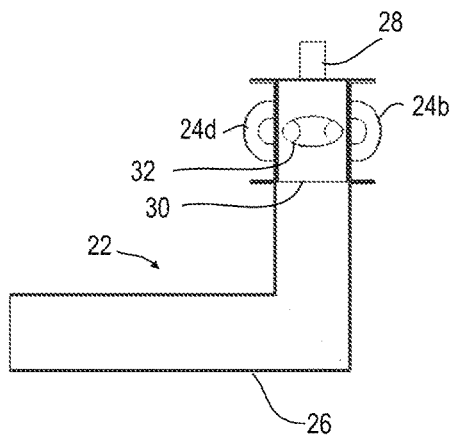
Fig. 1        Fig. 2
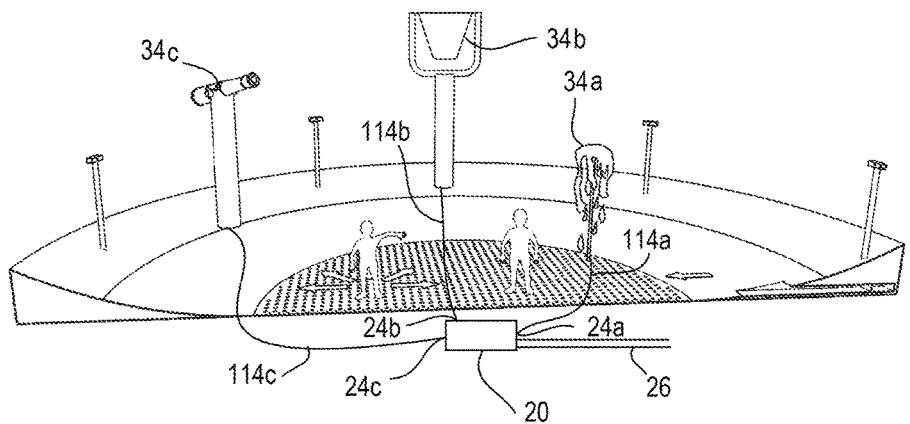
Fig. 3

ROTARY HYDRAULIC DISTRIBUTION MANIFOLD FOR WATER PLAY FEATURES

RELATED APPLICATIONS

This application claims priority benefit of U.S. Provisional Ser. No. 62/347,061, filed Jun. 7, 2016, incorporated herein by reference.

BACKGROUND OF THE DISCLOSURE

Field of the Disclosure

This application is related to the field of outlet selector valves having an inlet, a housing, and a plurality of sequentially selected outlets. The disclosed manifold relates particularly well as a multi-port water dispersion manifold for dispersing water to water play features and/or slides in a waterpark or water play structure.

BRIEF SUMMARY OF THE DISCLOSURE

Disclosed herein is a rotary hydraulic distribution manifold for water play features comprising: a fluid inlet; a housing having a fluid conduit to the fluid inlet; a distribution liner positioned within the housing; the distribution liner having a surface defining a distribution liner port; the housing having surfaces defining a plurality of housing outlets; and a drive unit configured to rotate the distribution liner within the housing to sequentially align the distribution liner port with the housing outlets so as to intermittently provide a fluid conduit between the fluid inlet and one or more housing outlets.

The rotary hydraulic distribution manifold for water play features as recited may be arranged wherein the distribution is a hollow cylinder with distribution liner ports in the radially outward surface thereof.

The rotary hydraulic distribution manifold for water play features as recited may be arranged wherein the distribution is other than cylindrical, with distribution liner ports there through.

The rotary hydraulic distribution manifold for water play features as recited may be arranged wherein the drive unit comprises a turbine within the housing, the turbine fixed to the distribution liner and configured to rotate the distribution liner as fluid flows through the housing.

The rotary hydraulic distribution manifold for water play features as recited may be arranged wherein the turbine comprises vanes affixed to the surface defining the distribution port.

The rotary hydraulic distribution manifold for water play features as recited may be arranged wherein the turbine comprises surfaces defining slots in the distribution liner, overlapping the housing outlets, the slots not aligned with a rotational axis of the drive unit.

BRIEF DESCRIPTION OF THE SEVERAL VIEWS OF THE DRAWINGS

FIG. 1 is a highly schematic side view of one example of the disclosed manifold.

FIG. 2 is a cut away side view of the manifold shown in FIG. 1.

FIG. 3 is a highly schematic example of the disclosed manifold used in a water play feature.

DETAILED DESCRIPTION OF THE DISCLOSURE

Figure 4:
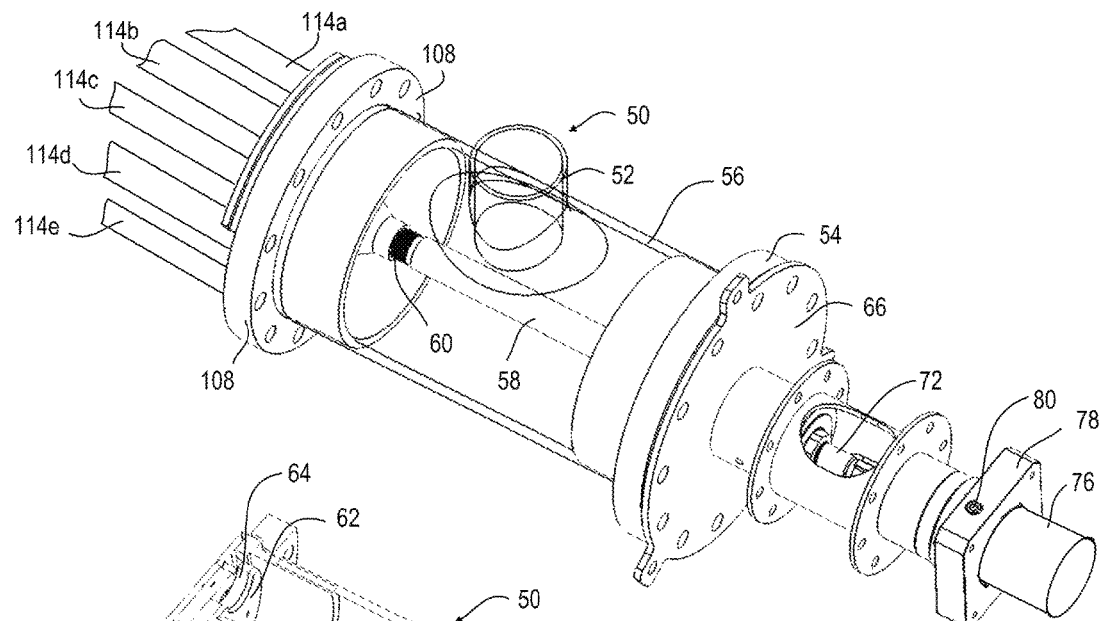
FIG. 4 is a perspective view of another example of the disclosed manifold.

In the field of water parks and water play features it is often desired to drive a plurality of water features such as nozzles, waterfalls, sprinklers, dumping apparatus etc. from a single water inlet in a sequential manner. Use of a selector valve in such a way may reduce the overall volume of water utilized amongst the associated features, and may add to the experience of those participating by a perceived randomness or sequence of the water features.

For example, a single water outlet may be connected to a linear sequence of sprinklers actuated in series resulting in a "chasing" perception to the water feature.

FIG. 1 shows a highly schematic side view of one example of the Rotary Hydraulic Distribution Manifold (manifold) 20. The manifold 20 of this example has an outer liner (housing) 22 with two or more outlet ports (apertures) 24 (24a-24e) through the housing 22. An inlet pipe 26 is attached to the manifold outer liner 22 and provides a fluid conduit for water from a water source to the interior of the housing 22. A drive unit 28 such as servo motor, step motor, geared actuator, linear actuator and rotary arm, etc. is attached to the manifold and positions (rotates) an internal liner 30.

FIG. 2 is a cut away side view of the manifold 20 showing the components within the housing 22 such as the inner liner 30. The inner liner 30 includes surfaces defining one or more inner liner outlets 32 that sequentially overlap outlet ports 24 as the inner liner 30 is rotated by the drive unit 28.

In such an example, as water is provided to the inlet pipe 26, the water flows into the inner liner 30. If the inner liner outlets 32 overlap one or more outlet ports 24 in the housing 22, the water will flow through the outlet ports 24 to the water feature 34 (a-c) attached thereto. As the drive unit 28 rotates the inner liner 30, the inner liner outlets 32 will also rotate thus sequentially opening a fluid conduit from the inlet pipe 26 to one or more outlet ports 24. In an example where there are a plurality of inner liner outlets 32, water may be provided to multiple outlet ports 24 at the same time. Thus, a single water source (inlet pipe 26) may drive a plurality of water features without a significant reduction in water pressure nor a significant increase in water volume supplied.

While the example disclosed above functions adequately well in testing, it was found that expansion loads on the housing 22 as pressure increased within the inner liner 30 resulted in a high torsion load on the drive unit 28. Thus, a solution was sought which resulted in the example shown below utilizing a distribution liner which is not cylindrical.

Figure 5:
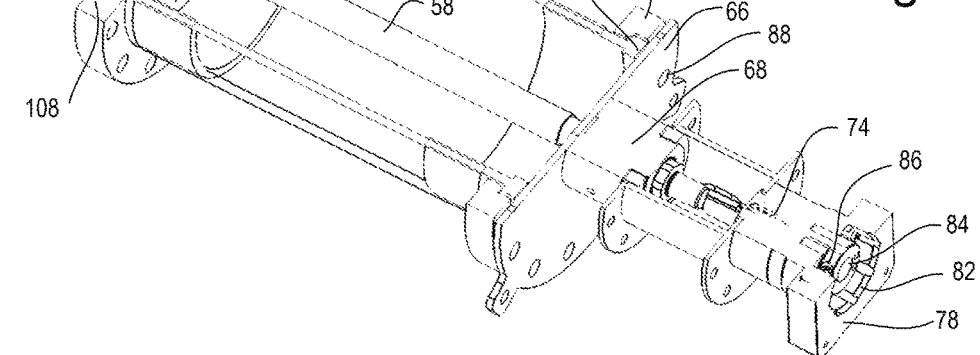
FIG. 5 is a cutaway view of the example shown in FIG. 4.

FIG. 4 shows a second example of a rotary hydraulic distribution manifold (RHD Manifold) 50. This example differs from the first example shown in FIGS. 1, 2 in several respects. In this example, the inlet 52 is tangential to the housing 54 rather than being longitudinally aligned, although either configuration is interchangeable with the other. The housing 54 comprises a distribution chamber 56 which is substantially hollow and forms a fluid conduit to the inlet 52. In the example shown, the distribution chamber 56 and inlet 52 are shown substantially transparent to more easily show the shaft 58 and other components there within. In this example, as can be seen in FIG. 5, a shaft 58 traverses the distribution chamber 56. The shaft may have a threaded end 60 or other coupling structure coupled to a distribution liner 62. The distribution liner 62 of this example has surfaces defining distribution liner ports 64 forming a fluid conduit to the inlet 52. As the distribution liner 62 rotates, the liner ports 64 sequentially align with endplate ports in a similar manner to that disclosed relative to the first example.

The distribution liner 62 is configured to rotate with the shaft 58 in a similar manner to that disclosed above relative to the first example. In this example, the opposing end of the distribution chamber 56 comprises an end plate 66 through which passes a portion of the shaft 58. In at least one example, it will be desired to have the interface between the end plate 66 and the shaft 58 sealed to prohibit water passing there through.

To reduce friction, a bearing housing 68 may be fixed to the end plate 66 by way of a plurality of fasteners. The bearing housing 68 positioning a bearing which contacts the bearing housing 68 and the shaft 58, to reduce friction and optionally to hydraulically seal the distribution chamber 56. Such shaft seals are well-known in the art.

In addition, a shaft coupling 72 may be provided between the shaft 58 and a motor shaft 74. The motor shaft 74 when provided connects the shaft 58 to a drive unit 76. In example shown, the drive unit 76 is fixed to a motor mount 78 in one example by way of a set screw 80 which is threaded into the motor mount 78 and compresses the drive units 76 within a motor receiver 82. The motor mount 78 prohibiting movement of the outer casing of the drive units 76. Also shown is a motor shaft coupling 84 having in one example a set screw 86 connecting the motor shaft 74 to a rotating portion of the drive unit 76.

In this arrangement, as the drive unit 76 rotates, the distribution liner 62 will also rotate.

The arrangement shown here is useful for example wherein the shaft 58 passes through the distribution chamber 56 however, in another example, the shaft 58 may be mounted on the opposing longitudinal side so as to engage the distribution liner 62 without passing through the distribution chamber 56.

Looking to FIG. 5, it can be seen that the end plate 66 comprises a plurality of surfaces defining voids 88 through which fasteners may be passed which engage a ring 90. When properly compressed, this forms a seal at the interface 92 between the end plate 66 and the distribution chamber 56.

Figure 6:
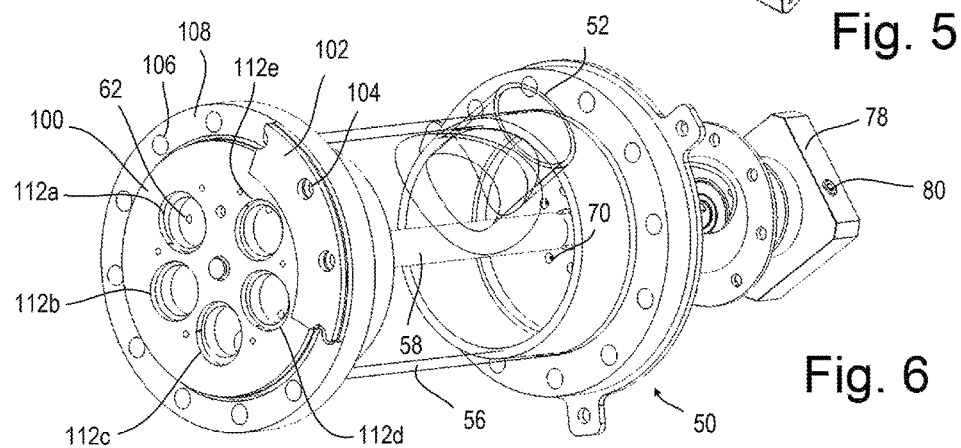
FIG. 6 is an end perspective view of the example shown in FIG. 4.
Figure 7:
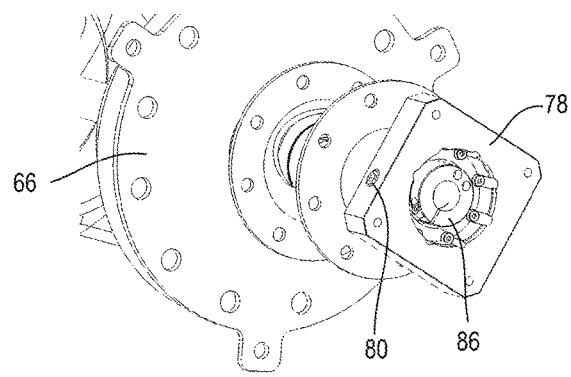
FIG. 7 is an end perspective view of the example shown in FIG. 4 from the opposing end shown in FIG. 7.

FIG. 6 shows the opposing end of the distribution chamber 56 where an end plate disk 100 is attached to the opposing end of the distribution chamber 56 in a similar manner. An end plate ring 102 (of which is only shown a portion thereof in FIG. 6) comprises a plurality of surfaces defining voids 104. Fasteners pass through the voids 104 and engage surfaces defining voids 106 in an end plate ring 108. Thus as the fasteners are tensioned, the end plate disk 100 is compressed at the interface 110 forming a seal thereto.

As can be seen, the end plate disk 100 comprises a plurality of surfaces defining housing outlets 112 (a-e). As the distribution liner 62 rotates, the distribution liner port(s) 64 sequentially align with the outlets 112 forming a fluid conduit between the inlet 52 and the outlets 112.

Looking back to FIG. 4 a plurality of outlet conduits 114 (a-e) are sealed to the outlets 112 and lead to water features 34 as can be seen in FIG. 3.

Figure 8:
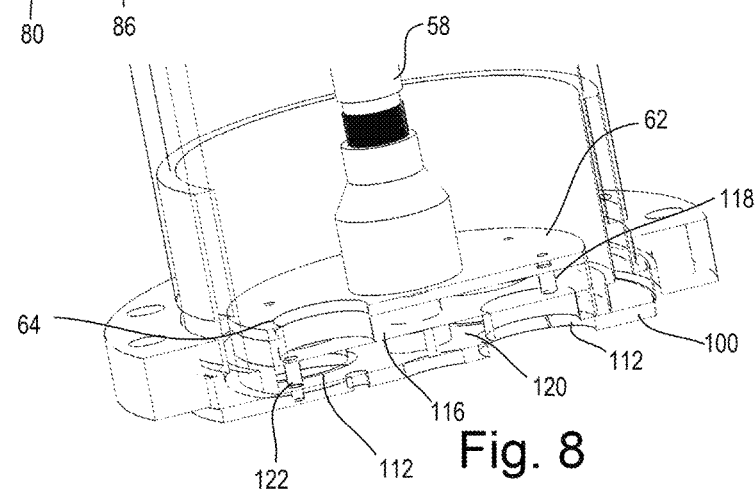
FIG. 8 is a wireframe cutaway view of the example shown in FIG. 4.

Looking to FIG. 8 it can be seen that the distribution liner 62 comprises a rigid component fixed to the shaft 58 and a bearing or sealing disk 116 fixed thereto in one example by way of fasteners 118. The sealing disk 116 may be a softer material providing a fluid seal and a friction reducing bearing between the distribution liner 62 and the end plate disk 100. The distribution liner ports 64 must therefore pass through the distribution liner 62 as well as the sealing disk 116.

Similarly, a fixed sealing disk 120 may be fixed to the end plate disk 100 by way of a plurality of fasteners 122. The fixed sealing disk 120 as well as the sealing disk 116 may be formed of high density polyurethane, plastics, polyethylene, or an equivalent material.

Is to be understood that the housing outlets 112 in this example comprise surfaces passing through the fixed sealing disk 120 and the end plate disk 100.

Figure 9:
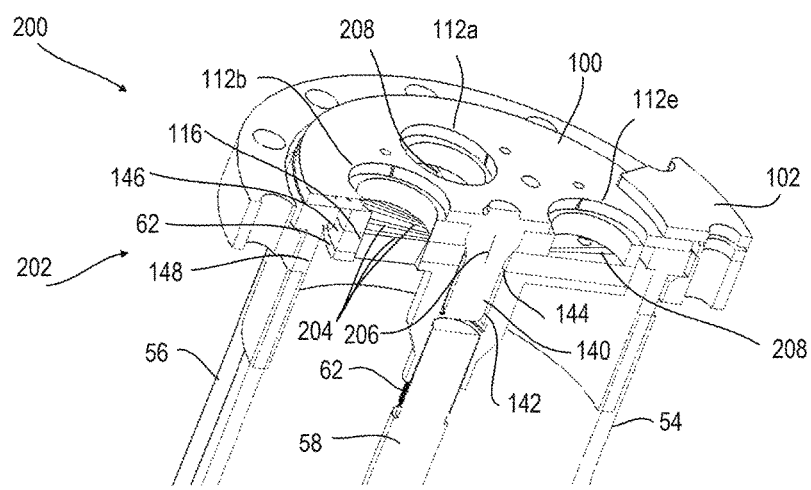
FIG. 9 is another cutaway view of the example shown in FIG. 4.

Looking to FIG. 9, the end plate disk 100 is shown in cross-section comprising a longitudinal projection forming a guide shaft 140. The guide shaft 140 aligned with the shaft 58 and forming a bearing surface 142 engaging a bearing surface 144 of the sealing disk 116 and or distribution liner 62. As the radially outward edge 146 of the distribution liner 62 and/or sealing disk 116 do not extend to the radially inner surface 148 of the distribution chamber 56, the guide shaft 140 maintains alignment of the rotating components relative to the distribution chamber 56 and particularly to the end plate disk 100 to ensure alignment of the distribution liner ports 64 with the housing outlets 112.

In the Example shown in FIG. 9, the rotary hydraulic distribution manifold 20 for water play features may be arranged wherein the drive unit 200 comprises a turbine 202 within the housing 54 and fixed to rotate the distribution liner 62 as water or other fluid passed through the distribution liner port(s) 64. The turbine 202 of this example fixed to the distribution liner 62 and is configured to rotate the distribution liner 62 as fluid flows from the inlet 52 through the housing 54, and out of the manifold 20 through the outlets 112.

The rotary hydraulic distribution manifold for water play features as recited may be arranged wherein the turbine 202 of this example comprises vanes 204 affixed to the surface defining the distribution port(s) 64. The vanes 204 are angled relative to the rotational axis 206 of the distribution liner 62 and thus exert a rotational force upon the distribution liner 62 as the distribution liner ports 64 align with the outlets 112.

The rotary hydraulic distribution manifold for water play features as recited may be arranged wherein the turbine 202 comprises surfaces defining slots 208 in the distribution liner 62, overlapping the housing outlets 112 and not overlapping the distribution liner ports 64. The slots 208 are not aligned with the rotational axis 206 of the drive unit 200, and are configured to impart a rotational force upon the distribution liner 62 while allowing only a small amount of water to flow there through. This arrangement solves a potential problem of the distribution liner 62 stopping with no distribution liner port 64 overlapping a housing outlet 112. Water will flow though the angled slots 208 and impart a rotational force on the distribution liner 62 until the distribution liner 62 rotates to a rotational position wherein a distribution liner port 64 overlaps a housing outlet 112. Once the distribution liner 62 rotates to a rotational position wherein a distribution liner port 64 overlaps a housing outlet 112, the vanes 204 will impart a rotational force on the device, and the distribution liner port 64 will allow a much larger flow of fluid through the manifold 20 or 50.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A rotary hydraulic distribution manifold for water play features comprising:
   a fluid inlet;
   a housing having a fluid conduit to the fluid inlet;
   a distribution liner positioned within the housing;
   the distribution liner having a surface defining a distribution liner port;
   the housing having surfaces defining a plurality of housing outlets;
   a drive unit configured to rotate the distribution liner within the housing to sequentially align the distribution liner port with the housing outlets so as to intermittently provide a fluid conduit between the fluid inlet and one or more housing outlets;
   a turbine within the housing;
   the turbine fixed to the distribution liner and configured to rotate the distribution liner as fluid flows through the housing; and
   wherein the turbine comprises vanes within the distribution liner port.

2. The rotary hydraulic distribution manifold for water play features as recited in claim 1 wherein the distribution liner is a hollow cylinder with the distribution liner port in the radially outward surface thereof.

3. The rotary hydraulic distribution manifold for water play features as recited in claim 1 wherein the distribution liner is a planar disk with the distribution liner port there through.

4. The rotary hydraulic distribution manifold for water play features as recited in claim 1 wherein the turbine comprises vanes affixed to the surface defining the distribution port.

5. The rotary hydraulic distribution manifold for water play features as recited in claim 4 wherein the turbine comprises surfaces defining slots in the distribution liner, overlapping the housing outlets, the slots not aligned with a rotational axis of the drive unit.

6. The rotary hydraulic distribution manifold for water play features as recited in claim 1 comprising:
   a sealing disk fixed to the distribution liner, and
   the sealing disk comprising a material providing a fluid seal as well as a friction reducing bearing between the distribution liner and the end plate disk.

7. The rotary hydraulic distribution manifold for water play features as recited in claim 6 wherein the distribution liner ports extend through the distribution liner and the sealing disk.

* * * * *